(12) United States Patent
Fiske et al.

(10) Patent No.: US 10,592,288 B2
(45) Date of Patent: *Mar. 17, 2020

(54) DYNAMIC RESOURCE ALLOCATION BASED ON DATA TRANSFERRING TO A TIERED STORAGE

(71) Applicant: International Business Machines Corporation, Armonk, NY (US)

(72) Inventors: Rahul M. Fiske, Pune (IN); Akshat Mithal, Pune (IN); Sandeep R. Patil, Pune (IN); Subhojit Roy, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/161,386

(22) Filed: Oct. 16, 2018

(65) Prior Publication Data
US 2019/0050260 A1   Feb. 14, 2019

Related U.S. Application Data

(63) Continuation of application No. 15/332,641, filed on Oct. 24, 2016, now Pat. No. 10,120,720, which is a continuation of application No. 14/959,076, filed on Dec. 4, 2015, now Pat. No. 9,513,968.

(51) Int. Cl.
*G06F 9/50* (2006.01)
*H04L 29/08* (2006.01)
*G06F 3/06* (2006.01)
*H04L 12/24* (2006.01)

(52) U.S. Cl.
CPC ............ *G06F 9/5016* (2013.01); *G06F 3/061* (2013.01); *G06F 3/0611* (2013.01); *G06F 3/0647* (2013.01); *G06F 3/0649* (2013.01); *G06F 3/0683* (2013.01); *G06F 3/0685* (2013.01); *G06F 9/50* (2013.01); *H04L 41/0896* (2013.01);
(Continued)

(58) Field of Classification Search
CPC .... G06F 9/5016; G06F 3/0647; G06F 3/0611; G06F 3/0683; G06F 9/50; G06F 3/061; G06F 3/0685; H04L 67/1097; H04L 41/0896
See application file for complete search history.

(56) References Cited

U.S. PATENT DOCUMENTS

| | | |
|---|---|---|
| 6,359,883 B1 | 3/2002 | Lechleider |
| 6,721,789 B1 | 4/2004 | DeMoney |
| 7,054,943 B1 | 5/2006 | Goldszmidt et al. |

(Continued)

OTHER PUBLICATIONS

List of IBM Patents or Patent Applications Treated as Related, Oct. 16, 2018, 2 pages.

*Primary Examiner* — Benjamin C Wu
(74) *Attorney, Agent, or Firm* — Robert J. Shatto

(57) ABSTRACT

A computing system includes a computer in communication with a tiered storage system. The computing system identifies a set of data transferring to a storage tier within the storage system. The computing system identifies a program to which the data set is allocated and determines to increase or reduce resources of the computer allocated to the program, based on the set of data transferring to the storage tier. The computing system discontinues transferring the set of data to the storage tier if a resource allocated to the program cannot be increased.

17 Claims, 5 Drawing Sheets

(52) U.S. Cl.
CPC ........ *H04L 67/1097* (2013.01); *G06F 3/0604* (2013.01); *H04L 41/50* (2013.01)

(56) References Cited

U.S. PATENT DOCUMENTS

| | | |
|---|---|---|
| 8,578,114 B2 | 11/2013 | Jennas, II et al. |
| 8,762,524 B2 | 6/2014 | Weiser et al. |
| 8,918,613 B2 | 12/2014 | Kato et al. |
| 8,949,483 B1 | 2/2015 | Martin |
| 8,954,671 B2 | 2/2015 | Maki et al. |
| 8,984,221 B2 | 3/2015 | Satoyama et al. |
| 9,015,412 B2 | 4/2015 | Miwa et al. |
| 9,335,948 B1 | 5/2016 | Kirac et al. |
| 9,513,968 B1 | 12/2016 | Fiske et al. |
| 9,703,664 B1 | 7/2017 | Alshawabkeh et al. |
| 9,753,987 B1 | 9/2017 | Dolan et al. |
| 10,001,927 B1 * | 6/2018 | Trachtman ............. G06F 3/061 |
| 10,095,800 B1 * | 10/2018 | Yalamanchi ........ G06F 21/6227 |
| 2004/0205206 A1 | 10/2004 | Naik et al. |
| 2004/0243692 A1 | 12/2004 | Arnold et al. |
| 2005/0165925 A1 | 7/2005 | Dan et al. |
| 2005/0188075 A1 | 8/2005 | Dias et al. |
| 2008/0126547 A1 | 5/2008 | Waldspurger |
| 2009/0180430 A1 | 7/2009 | Fadell |
| 2010/0064337 A1 | 3/2010 | Dvir et al. |
| 2010/0293334 A1 * | 11/2010 | Xun ..................... G06F 16/9014 |
| | | 711/129 |
| 2012/0114314 A1 | 5/2012 | Pashkevich et al. |
| 2012/0236713 A1 | 9/2012 | Kakadia et al. |
| 2013/0179636 A1 | 7/2013 | Shirasu et al. |
| 2013/0212578 A1 | 8/2013 | Garg et al. |
| 2014/0122695 A1 | 5/2014 | Kulikov et al. |
| 2014/0258446 A1 | 9/2014 | Bursell |
| 2015/0189540 A1 | 7/2015 | Jung et al. |
| 2015/0236926 A1 | 8/2015 | Wright et al. |
| 2017/0160983 A1 | 6/2017 | Fiske et al. |

\* cited by examiner

DYNAMIC RESOURCE ALLOCATION BASED ON DATA TRANSFERRING TO A TIERED STORAGE

BACKGROUND

The present disclosure relates to computing systems utilizing tiered storage. More particularly, the present disclosure relates to managing allocation of computer and storage resources in a computing system utilizing tiered storage.

A tiered storage system includes two or more tiers of storage, each of which may be a different type of storage medium and may have different performance characteristics. A particular storage tier may be higher performance than one or more other tiers. The storage system may transfer data from a lower performing tier to a higher performing tier in response to more frequent accesses to the data. Alternatively, a tiered storage system may transfer data from a higher performing tier to a lower performing tier in response to less frequent accesses to the data, or to make space available in the higher performing tier for other data.

In response to data transferring to a higher performing tier, a program accessing that data may be able to increase computational throughput. Increasing computational throughput may correspond to increasing resources of the computer allocated to the program, such as CPU or memory. A resource management function of the computing system may determine which resources are suitable and may allocate those resources. Alternatively, a program accessing data stored in, or transferring to, a lower performance tier may, in relation to having lower performance access to the data, be unable to fully utilize some of the resources of the computer allocated to that program. As other programs may utilize such resources, a resource management function of the computing system may de-allocate, or release, resources the program cannot fully utilize.

To modify allocation of resources to a program, in relation to the locality of data within the storage system, the resource management function must be aware of the data transferring to, or from, the various tiers of the storage system. However, it is a feature of tiered storage systems to manage the momentary, or dynamic, location and transfer of data among the storage tiers transparently to programs accessing that data, and to other components of the computer or computing system. Thus, there is a need to communicate, from a storage system to a resource management function of the computing system, which tiers particular data is transferring to or from, as the storage system prepares or performs transferring that data.

It is an aspect of computing systems that programs may be limited with respect to particular resources of a computer. Limits to those resources may, in turn, limit the ability of a program to access data at a rate corresponding to that data being stored in a higher performing tier of a storage system. If, as a result of such limitations, a program cannot utilize higher performance access to data stored in a higher performing tier, the storage system may transfer the data to a lower performing tier, or may determine to not transfer other data accessed by that program to a higher performing tier.

However, it is another aspect of tiered storage systems that the storage system is unaware of the allocation of computer resources to programs accessing data in the storage system, or the utilization of those resources. Thus, there is a need to communicate, from the computer, or a resource management function of the computing system, to the storage system that a program cannot utilize higher performance access to particular data. The computing system, or the storage system, may thereby determine to discontinue transferring that particular data to the higher performance tier, or may determine to transfer that data to a lower performing tier.

SUMMARY

Features of the present disclosure include a method for managing resources of a computing system having a computer in communication with a tiered storage system. According to aspects of the method, a set of data is determined to be transferring to a particular storage tier of the storage system. The method includes identifying a program operating in the computer. The program is identified based on the program accessing the set of data and the set of data transferring to the particular storage tier.

Based on the set of data transferring to the particular storage tier, a resource of the computer is identified that is suitable for utilization by the program. The method further includes determining a "modification amount" of the resource, which is used to modify an amount of that resource allocated to the program. Determining the modification amount is based on data transferring to the particular storage tier and the dynamic state of one or both of the resources of the computer and the resources of the computer allocated to the program. According to the method, the amount of the resource allocated to the program is modified using the modification amount. The modification balances allocation of resources of the computer to various programs to improve utilization of the resources of the computer and overall performance of the programs, the computer, and the computing system. In a feature of the method, the resource is at least one of: a portion of a processor, a portion of a co-processor, a portion of a memory, a portion of a storage medium, and a portion of a networking resource.

According to some aspects of the method, the modification amount is an amount of the resource available to allocate to the program and, accordingly, the method includes allocating the modification amount of the resource to the program. Increasing the amount of the resource improves overall performance of the program, the computer, and the computing system.

According to other aspects of the method, the modification amount is determined to be an unutilized amount of the resource allocated to the program. The unutilized amount is based on the set of data transferring to the storage tier. Accordingly, the method includes decreasing the amount of the resource allocated to the program by the modification amount. Decreasing the amount of the resource enables allocation of the unutilized amount of the resource to other programs, and improves utilization of the computer resources and overall performance of the programs, the computer, and the computing system.

In another aspect of the method, the resource may not be available to allocate to the program, or the program may not be permitted to increase allocation of the resource to that program. Correspondingly, according to the method, the modification amount is determined to be zero and the allocation of the resource to the program is not modified. The method further includes, based on the modification amount being zero, discontinuing the storage system transferring the set of data to the storage tier. Discontinuing transferring the data to the higher performance tier enables the storage system to determine optimal location of data, improving the overall performance of the storage system, the computer, and the computing system.

The method may be embodied in a computer program product that instructs a computer to perform aspects of the method. A computing system may be configured to perform the method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
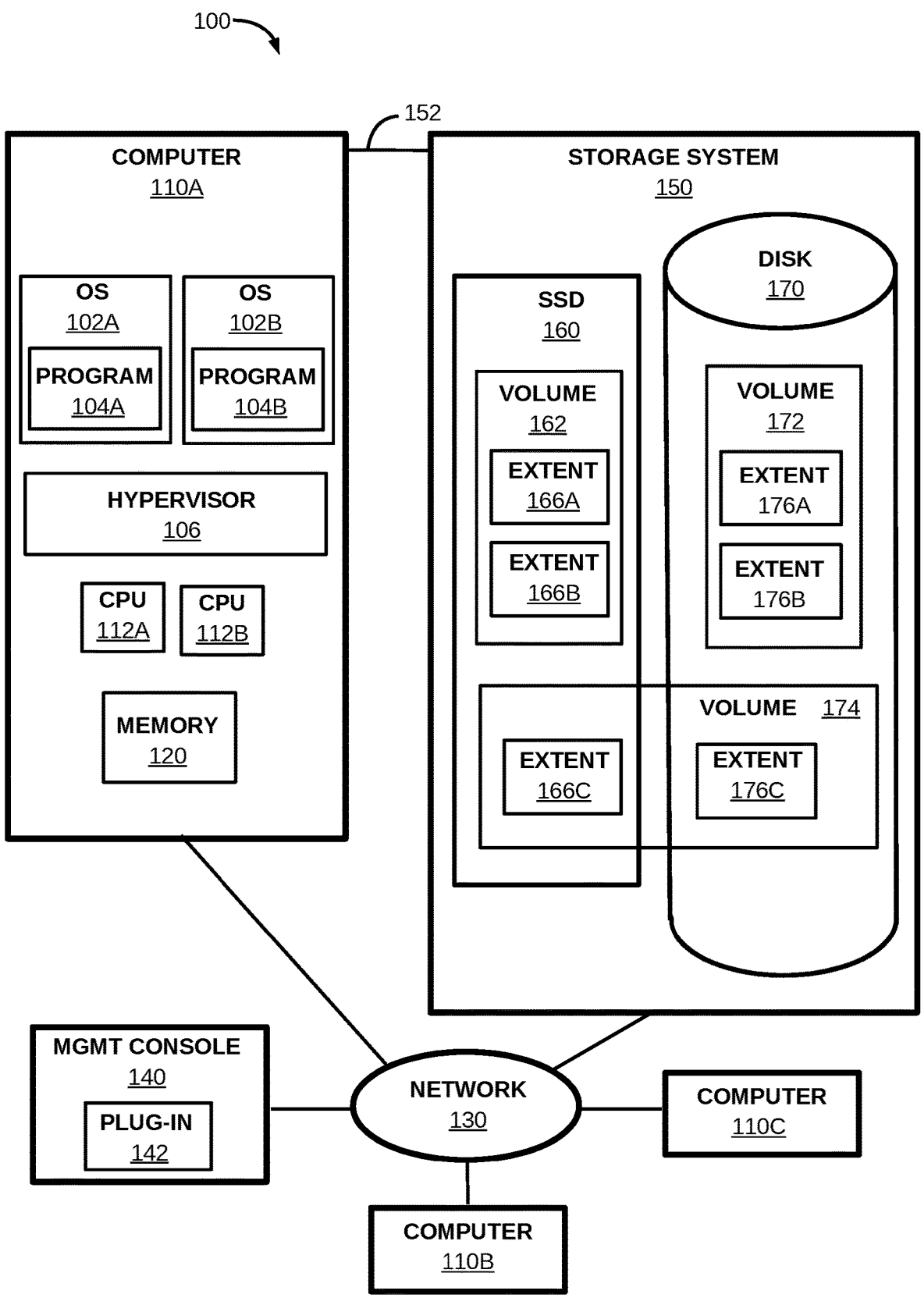
FIG. 1 is a block diagram illustrating an example computing system including a tiered storage system, according to features of the disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure relate to managing resources of a computing system that includes a computer in communication with a tiered storage system. More particular aspects relate to allocation of resources in a computer according to data transferring between tiers of the storage system. Other aspects of the disclosure relate to placement of data in tiers of the storage system according to the availability or utilization of resources of the computer allocated to a program. While the present disclosure is not necessarily limited to such applications, various aspects of the disclosure may be appreciated through a discussion of various examples using this context.

A tiered storage system includes two or more tiers of storage, each of which may have a different type of storage medium and which may have differing performance characteristics. A first storage tier may be a higher performance storage medium, such as a flash memory or solid-state disk (SSD), compared to other tiers, such as a second tier that utilizes, for example, a rotating magnetic disk. Correspondingly, a storage system may monitor accesses to data stored in the various tiers and may transfer data between a lower performing tier and a higher performing tier based on that monitoring. Transferring the data to, or from, a particular tier may be in response to more, or less, frequent accesses to the data; to more recent accesses; or, to other metrics associated with the data, accesses to the data, or the operations of the storage system.

In response to data transferring to a higher performance tier, a program accessing that data may be able to increase computational throughput by, for example, increasing resources of the computer allocated to the program, such as CPU or memory resources. To increase allocation of those resources to the program, a resource management function of the computing system, managing the resources of the computer, must be aware that the data is transferring to the higher performance tier storage.

Alternatively, the storage system may transfer data from a higher performance tier to a lower performance tier. Such transfers may be the result of less frequent accesses to particular data, which may be subsequent to locating the data in the higher performance tier. The storage system may transfer data from a higher performance tier as that higher performance tier becomes more fully utilized, such as to make space in that tier available to store other data more recently accessed. A storage system may transfer data from a higher performance tier for reasons related to other patterns of access to the data, or related to the dynamic state of storage media within the storage system.

A program accessing data stored in a particular tier of the storage system may be unable to utilize all of the resources of the computer allocated to that program, such as CPU or memory resources. The program may be unable to utilize a portion of the resources in relation to accessing data stored in that particular tier of the storage system. As other programs may utilize such resources, a resource management function of the computing system may, in relation to the tier in which the data is stored, de-allocate the portion of the resources that the program is unable to utilize. However, it is a feature of tiered storage systems to manage the location of data within the storage transparently to programs accessing that data, or other components of the computer, such as a resource management function. Thus, there is a need to communicate from the storage system to a resource management function of the computing system that particular data is stored in or transferring to particular tiers (e.g., higher, or lower, performing tiers) of the storage system.

Another aspect of a tiered storage system is that higher performance storage media may be more costly than lower performance media. Accordingly, the storage capacity of a higher performing tier may be less than the capacity of other, lower performing tiers. Programs accessing data in the storage system may be limited with respect to particular resources of a computer. Limits to those resources may, in turn, limit the program in a manner in which it cannot utilize higher performance access to data in a higher performance tier. In such a case, a storage system may be able to transfer the data to a lower performance tier, or to not transfer other data accessed by that program into the higher performance tier, and thereby make space available in the higher performance tier for other data.

However, it is also an aspect of some computing systems that the storage system is not privy to the allocation of resources of the computer, or the utilization of those resources by programs accessing data in the storage system. Thus, to enable the storage system to determine placement of data in the various tiers, there is a need to communicate, from a resource management function of the computing system to the storage system, that a program cannot utilize the access performance of a higher performance tier for particular data.

Methods of allocating computer resources to, or de-allocating resources from, a program in correspondence to locality of data in a tiered storage system may enable greater performance of the program or computing system overall. Accordingly, the present disclosure includes methods to increase or decrease computer resources allocated to a computer program in relation to locality of data accessed by that program within the tiers of a storage system.

Similarly, methods to discontinue transferring, or storing, data in a higher performing tier, when a program cannot utilize the rate of accesses to data in that tier, may enable a storage system to determine placement of particular data within the various tiers. Correspondingly, other programs accessing data in the storage system, the storage system itself, the computer, or the computing system overall may realize greater performance. Accordingly, the present disclosure includes methods to discontinue storing particular data in, or transferring particular data to, particular tiers of the storage system in relation to a program being unable to utilize data access rates of those tiers.

FIG. 1 illustrates an example computing system 100 having computers and a tiered storage system, according to features of the disclosure. Computer 110A includes CPUs 112A and 112B, and a memory 120. Embodiments may include only a single CPU, or may include a plurality of CPUs. CPUs may be single processors, multi-core processors, SMT processor threads, or virtualized forms of any of these. A computer may include only one memory, or may include a plurality of memories, and the memories may be of different types, such as main memory, cache memory, or flash memory. The CPUs and memory (or, memories) may be resources that can be allocated to a program operating in the computer.

The computer includes operating systems (OSes) 102A and 102B. Embodiments may include only a single OS or may include a plurality of OSes more than those shown in FIG. 1. OSes may be implemented within operating system partitions in a partitioned computer. An OS may include one or more programs, such as programs 104A and 104B included in OSes 102A and 102B, respectively. The programs may have a variety of functions, such as applications or workloads, resource managers, storage managers, and virtual memory managers.

Computer 110A also includes a hypervisor 106. In embodiments a hypervisor may manage or virtualize physical resources of a computer, and may allocate those resources to OSes or other programs. For example, a hypervisor may allocate CPUs, or fractions of a CPU (e.g., a virtual CPU) to OSes within the computer. A hypervisor may, similarly, allocate regions of memory to OSes within the computer. A hypervisor may also manage allocation of storage in a storage system, or storage device, to OSes. OSes may, in turn, manage allocation of CPUs, memory, or storage to programs operating within them.

Computer 110A is in communication 152 with a storage system 150. The manner of communication (152) between the computer and the storage system may be by means of any of a variety of interconnection mechanisms, including a direct connection (e.g., an 10 bus or link), a connection through another computer, or a network connection.

The storage system 150 is a tiered storage system, and has a tier-one storage 160 and a tier-two storage 170. A storage tier may include any of a variety of storage media or devices, such as a flash memory, an SSD, a hard drive (or, a group of hard drives), an optical drive, a tape drive, or other such storage devices. To illustrate, in the example storage system 150, tier-one is SSD and tier-two is a disk drive. A storage system may include additional tiers (e.g., a tier-three, not shown) and the additional tiers may be a different type of storage than either of tier-one or tier-two, such as optical or tape storage.

Within a tiered storage system individual tiers may have differing properties (such as capacity, bandwidth, or access latency) and the storage system may store data in one tier versus another based on such properties. For example, a tier-one storage may be SSD (or, another form of flash memory) and a tier-two storage may be one or more disk drives. SSD may have lower access latency than a disk drive and the storage system may, correspondingly, store data that is accessed more frequently in the SSD storage and store data that is accessed less frequently in the disk drive storage. In some embodiments, a storage system may store copies of particular data in multiple tiers. For example, a storage system may store in tier-one a copy of data also stored in tier-two, and may store the copy in tier-one during periods in which the data is frequently accessed.

Storage, or media, within a storage system may organized as "extents", which may correspond, for example, to a particular region, or set of regions, of a flash memory or SSD, or to a disk drive or a subset of the sectors of one or more disk drives. For example, tier-one 160 of the storage system includes extents 166A, 166B, and 166C and tier-two 170 includes extents 176A, 176B, and 176C. The tier-one extents may be regions, or logical disk drives, of the SSD, and the tier-two extents may be one or more disk drives, or sectors of one or more disk drives, in the tier-two disk storage.

A storage system may further organize extents into "volumes". For example, volume 162 of the storage system includes extents 166A and 166B and volume 172 includes extents 176A and 176B. A volume may encompass extents of a single storage device (or, medium) within the storage system or may encompass extents of a plurality of devices (or, media). For example, volume 162 encompasses only extents in tier-one and volume 172 encompasses only extents in tier-two, while volume 174 encompasses extents in both tier-one and tier-two. Volumes and extents in each tier of a tiered storage system may be of the same size, and the size of a volume or extent may be fixed or a variable size. For example, an extent may be some fixed number of storage blocks, and a volume maybe some fixed number of extents. Alternatively, the size of an extent or a volume may vary over the course of operating the storage system.

The number of volumes or extents in one tier may be the same as the number of volumes and extents in another tier. Alternatively, the number of extents in volumes of one tier may differ from the number in another tier. Differences between tiers in the size of extents, or in the number of extents within a volume, may relate to the total capacity of the storage system, the capacity of a particular tier, or the cost of the medium forming that tier. For example, less costly storage in one tier may allow for greater capacity, and more extents per volume, compared to another tier utilizing comparatively more expensive storage media. The number of extents or volumes included in each tier may be determined according to the capacity of the storage in that tier.

Programs, or OSes, within a computing system may share storage within a storage system. Particular volumes (or, extents) of the storage device may be allocated to one program and other volumes (or, extents) may be allocated to other programs (or, OSes). For example, in a partitioned computer, multiple OS images ("virtual machines", or "VMs") may operate within the computer, and each VM may be allocated one or more particular volumes within the storage system. The VMs may share resources of the computer, such as processors, memory, or network resources, and the amount of those resources allocated to a particular VM may determine the rate at which that VM (or, a program operating within the VM) accesses data within the storage system.

It is an aspect of tiered storage systems that the storage system transfers data (e.g., extents) between tiers in relation to performance characteristics of the tiers or of accesses to the data. In some embodiments a storage system may monitor dynamic characteristics of data stored within the storage system, such as frequency or number of accesses to particular volumes or extents. For example, a storage system may monitor accesses to an extent and may determine a frequency of access or may determine which extent (or, volume) within a tier of the storage system may have been most recently accessed.

A storage system may determine to store an extent (or, volume) in a particular tier based on the characteristics monitored. For example, a particular extent of a volume may have a higher (or, lower) frequency of access in comparison to extents of other volumes. The storage system may, correspondingly, determine to transfer that extent, or all extents of the volume containing that extent, to a higher performance tier (or, to a lower performance tier, if the frequency of access is comparatively lower).

A network 130 in the computing system interconnects computers 110A, 110B, 110C, a management console 140, and the storage system 150. The network may enable communications between any, or all, of the computers, the management console, and the storage system. Computers 110B and 110C may, in embodiments, be similar in structure and function to computer 110A, or may be other types of computers sharing the network. Computers 110A, 110B, and 110C may share storage in the storage system, or may simply communicate as a network of computers. In some embodiments a computer, such as 110A, may exclusively access the storage system, either via a network, such as network 130, or via another form of connection, such as 152, to the storage system.

A management console may be a component of a computer—such as a component of computer 110A, 110B, or 110C. A management console may, in some embodiments, be a component of a storage system. Elements, or functions, of a management console may be distributed among one or more computers and a storage system.

A management console may operate as, or embody, a resource management function of a computing system, such as computing system 100. For example, a resource management function may be embodied in computer 110A and may manage resources of the computer. The management console 140 may be embodied in a computer (not shown) in communication with computer 110A, and in communication with the storage system 150, and the communication may be via the network 130.

Management console 140 includes a plug-in 142. In an embodiment a management console, or a plug-in, such as plug-in 142, may manage configurations or interactions of computers or storage systems in a computing system. In embodiments of the disclosure a management console, or plug-in, may perform particular functions to operate the computing system—such as monitoring the operations of hardware, firmware, or software in a computer or storage system—or may facilitate information exchange between components of a computing system.

A computer or storage system may communicate service or usage information to a management console. For example, storage system 150 may send to management console 140 information regarding extents or volumes in the storage system accessed by programs operating in computer 110A. The management console may analyze the information and may take some action with regard to computer 110A or the storage system in response. The management console may act as an intermediary and forward the information to computer 110A, or may forward the results of an analysis of the information to computer 110A. Computer 110A may, in turn, act on information received from the management console.

Similarly, computer 110A may communicate to the management console information regarding operations of the computer, or regarding programs within the computer. The management console may analyze the information and may take some action with regard to the computer or the storage system in response. The management console may act as an intermediary and forward the information to the storage system, or may forward the results of an analysis of the information to the storage system. The storage system may, in turn, act on information received from the management console.

Figure 2:
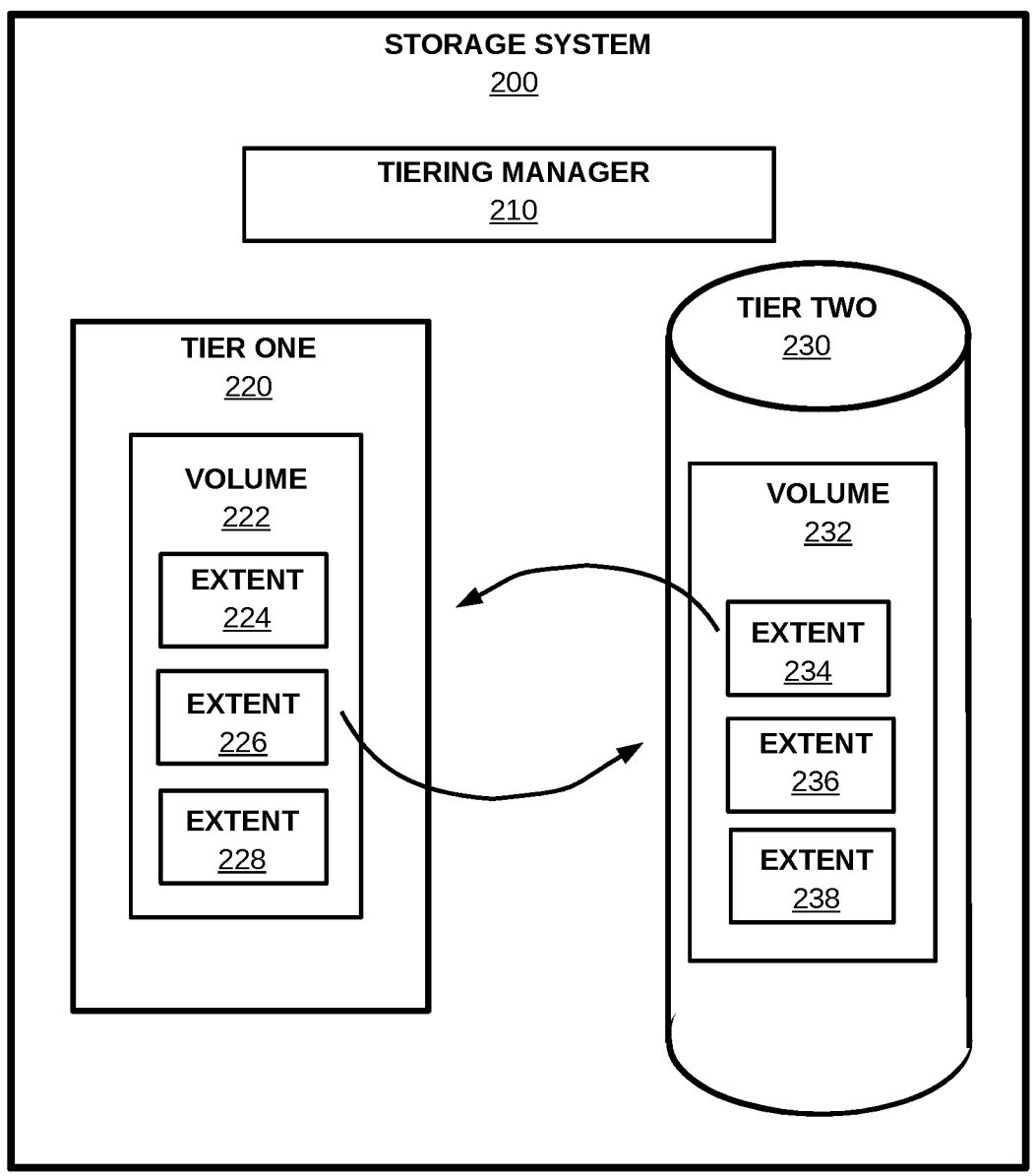
FIG. 2 is a block diagram illustrating an example tiered storage system, according to features of the disclosure.

FIG. 2 is a block diagram illustrating an example tiered storage system, according to features of the disclosure. Storage system 200 includes tier-one storage 220 and tier-two storage 230. Tier-one includes volume 222, which in turn includes extents 224, 226, and 228. Tier-two includes volume 232, which in turn includes extents 234, 236, and 238. The storage system includes a tiering manager 210. In embodiments, a tiering manager may manage the resources of the storage system, and may manage the location of data (e.g., extents or volumes) in tiers of the storage system. A tiering manager may communicate to a component of a computing system information regarding extents, volumes, or tiers within the storage system. Such a component may be a management console, or may be a component of a computer accessing data in the storage system, such as a resource management function.

A tiering manager, such as tiering manager 210, may manage, or facilitate, the organization of extents into volumes, or may manage transferring extents from one tier to another tier. For example, extent 234 may, at some time, reside in tier-two storage. For various reasons, the tiering manager may determine that extent 234 should be copied, or wholly transferred, to tier-one storage. Similarly, the tiering manager may determine that extent 226 should be copied, or wholly transferred, to tier-two storage. In some embodiments, the tiering manager may determine to transfer, or copy, all extents within a volume from one tier to another tier, and the tiering manager may determine to do so based on accesses to one, or a subset of, the extents included in that volume.

In embodiments, a tiering manager may monitor accesses to extents, or volumes, and may determine a pattern of accesses (e.g., a rate of access, or a latency between accesses). Based on a pattern of accesses to an extent, a storage system may anticipate that the program will access other extents included in the same volume. Accordingly, a tiering manager may transfer (or, prepare to transfer) an extent (or, volume) from a lower performance tier to a higher performance tier based on an access pattern. Alternatively, a tiering manager may transfer (or, prepare to transfer) an extent (or, volume) from a higher performance tier to a lower performance tier based on an access pattern. A tiering manager may also determine to transfer (or, prepare to transfer) an extent from a higher performance tier of the storage system in order to make room in the higher performance tier for other extents or volumes.

The storage system may transfer extents to, or from, various tiers of the storage transparently to the computer, or to components of the computer or computing system, such as a resource management function. Consequently, the computer, or other components of the computer or computing system, may be unaware of the location of particular sets of data (e.g., extents) among the tiers at a particular time. However, having such awareness a computer (or, for example, a resource management program) may be able to dynamically modify the allocation of certain resources of the computer in relation to the data transferring to, or from, that tier.

For example, a measure of performance within a computing system is I/O operations per second (IOPS) directed to data stored in the storage system. A program may be able to execute a particular number of IOPS in relation to an amount of CPU or memory allocated to the program. If a program accesses data (e.g., extents) that the storage system is transferring to a higher performance tier (e.g., in relation to the number or frequency of accesses), allocating more CPU or memory may enable the program to increase TOPS to that data. Increasing IOPS may, in turn, yield greater processing throughput (e.g., the rate at which the program or computer, overall, performs computations).

Alternatively, allocating more CPU or memory to the program may enable it to achieve greater processing throughput in relation to having lower latency access to data in a higher performance tier. In this case, lower latency access may avoid the program waiting for an access to the data to complete, such that the program then may perform additional computations and utilize increased CPU or memory resources. Similarly, having lower latency access to data may enable the program to perform additional network communications and the program may then be able to utilize additional network resources (e.g., network devices or bandwidth).

On the other hand, a storage system may store data in, or transfer data to, lower performance extents. As access patterns to particular extents change, some extents may need to be transferred to the higher performance tier. However, the higher performance tier may have limited storage capacity (e.g., a number of bytes) such that the storage system may need to transfer some extents from the higher performance tier to make room to store other extents. In such a case, a program accessing extents transferring to a lower performance tier may not be able to utilize all of the resources of the computer allocated to it, because of the data no longer being stored in the higher performance tier.

For example, transferring an extent to a lower performance tier may increase access latency to the extent. Correspondingly, the program may experience longer latency periods to access data in the extent and those longer latency periods may result in the program being unable to utilize a portion of CPU resources (e.g., because the program is idle during the latency period). As many programs may share CPU resources, the computer, or particular programs, may achieve greater performance by decreasing (e.g., de-allocating) the un-utilized portion of CPU allocated to the program and making that portion, then, available to other programs.

A system administrator may allocate, or deallocate, resources to a program (or, OS) in response to expected, or predicted, processing demands of that program, or in relation to particular allocation policies (e.g., a particular application may be allocated resources according to an administrative policy). A computer may feature "licensed" CPUs or memory, in which the system administrator licenses some, but not necessarily all, of the CPU or memory resources in the computer. The system administrator may license more or fewer such resources according to changing processing demands of the computer or applications (e.g., programs) operating in the computer.

However, transferring data from one tier to another may be highly dynamic, occurring in fractions of a second, as access patterns to the data change. It may not be practical for a human administrator to adjust (or, tune) resource allocations to the computer (e.g., licensing CPUs), or to particular programs, in response to such dynamic changes in access patterns or computational demands of the many programs normally operating in a computer. Thus, aspects of the present disclosure include communicating access patterns, or locality, or predicted locality, of data within particular tiers, from a tiered storage system to a resource management function of a computing system or computer.

Such communications may enable the computing system, or computer, to automatically modify the allocation of computer resources allocated to programs in relation to the changing location of data in the storage system, or to changing computational demands of the computing system. The computing system may increase, or decrease, resources allocated to a program—such as CPU, memory, or network bandwidth—in correspondence to the present or predicated locality of data accessed by the program within a storage system.

Figure 3:
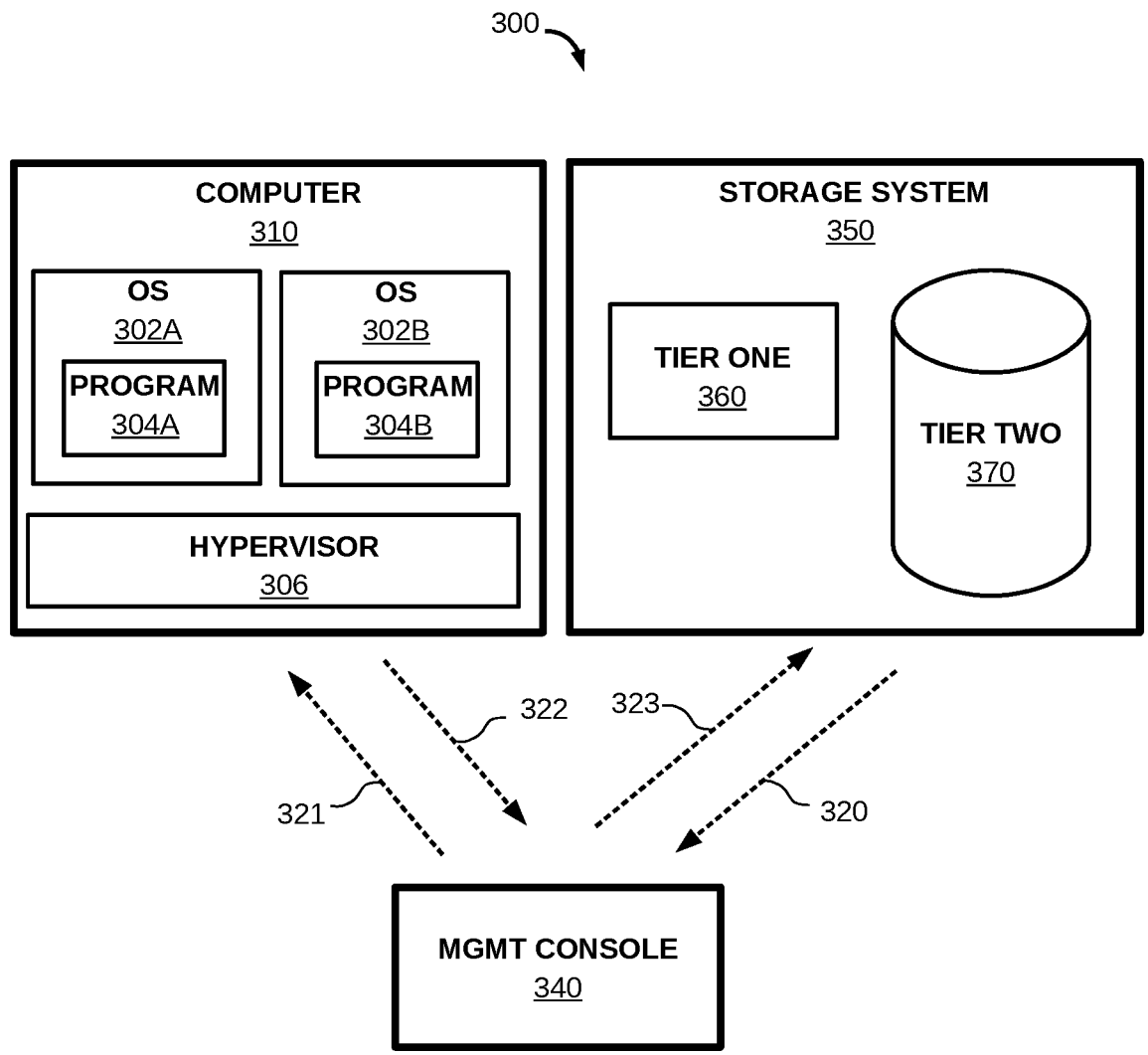
FIG. 3 is a block diagram illustrating example interactions of a computer, a tiered storage system, and a management console, according to features of the disclosure.

FIG. 3 is a block diagram illustrating example interactions of a computer, a tiered storage system, and a management console, according to features of the disclosure. Computing system 300 includes a computer 310, storage system 350, and management console 340, all in communication with each other. The storage system includes two storage tiers: tier-one 360 and tier-two 370. For purposes of illustrating the disclosure tier-one may be considered a higher performance tier of the storage system in comparison to tier-two. The computer stores data in the storage system, and the management console is configured to interact with the computer and the storage system.

It will be apparent to one of ordinary skill in the art that management console 340 is representative of any particular embodiment of a management console. For example, a management console may be a program operating in the computer 310 (e.g., a program of an OS or a hypervisor), the storage system 350, or some other element of the computing system 300. A management console may be embodied in another computer in communication with computer 310 or storage system 350. The management console may include a plug-in module (not shown).

Interactions or communications (e.g., sending information) between the management console and the storage system, or between the storage system and the computer, may be in the form of messages, hardware signals, computer program function calls, or other such communications, according to the manner in which the computer, storage system, and management console are configured within the computing system. For purposes of illustration, hereinafter "management console" refers to any function of a computing system, including a plug-in, that operates, according to features of the disclosure, to communicate information between a storage system and a computer storing data in that storage system.

The computer includes OSes 302A and 302B, and OSes 302A and 302B include programs 304A and 304B, respectively. In embodiments, there may be a plurality of programs operating within a particular OS. The OSes may manage the allocation of resources of the storage system to the programs and may allocate volumes, or extents, to the programs. The OSes may direct the storage system to enable or discontinue the transfer of extents, or volumes, allocated to the programs between tiers of the storage system. The OSes may manage the allocation of resources of the computer to the programs.

The computer further includes a hypervisor 306, and includes CPUs and memory (both not shown), which may be similar in manner to computer 110 of FIG. 1. The hypervisor may manage allocation of resources of the computer to the OSes, such as CPUs, memory, storage, or network resources (e.g., physical or virtualized network devices). A hypervisor may also administer, or participate in administering, CPU or memory licensed to OSes or programs. A system administrator may establish policies that determine how a hypervisor administers CPU or memory licenses of a computer.

In embodiments, a storage system, computer, or management console of a computing system may interact to manage resources of the computer, or data stored in the storage system, according to the example of FIG. 3. In an embodiment the storage system may monitor the transfer of extents between tiers within it, such as between tier-one 360 and tier-two 370. The storage system may determine access patterns, and may determine which particular extents are stored in, or may predict which extents are likely to transfer to, tier-one or tier-two of the storage system.

To illustrate aspects of the disclosure, storage system 350 sends (320) information to the management console 340. The information may include which extents are currently stored in, or are predicted to transfer to, tier-one (or, tier-two) and may further include information regarding the number or rate of accesses to those extents, or other aspects of access patterns. The storage system may send information at one or more particular times in the operations of the computer or storage system (e.g., power on or reset), or may periodically send such information. The frequency at which the storage system may periodically send information to the management console may be established as a fixed rate, such as corresponding to average access or extent transfer latencies of the storage, or may be varied as access latencies or transfers or extents between tiers increase or decrease, for example.

The management console may receive, and may process, the information. Processing the information may include analyzing the information to determine trends or locations of data related to transferring extents between tiers. For example, the management console may determine that particular extents of a volume may be transferring to tier-one (or tier-two), based on other extents of that volume having transferred, or based on an indication (e.g., an access pattern) from the storage system that predicts that particular extents will transfer to tier-one (or, tier-two).

Illustrating other aspects of the disclosure, the management console sends (321) information to the computer regarding the information received (320) from the storage system. The information may be the information received from the storage system, may be information resulting from the management console processing the information received (320), or may be a combination of both. The computer, or a component of the computer, further receives (321) the information from the management console. In some embodiments a storage system may communicate directly with a computer, such that communicating the information to the computer (320 and 321) is a single interaction between the computer and storage system that does not involve a management console, or involves a management console function embodied in the computer or the storage system.

Computer 310 may include a resource management function—for example, a program of an OS or the hypervisor. The resource management function may use the information received (321) to modify allocation of resources of the computer to programs such as 304A or 304B. OS 302A may, for example, increase or decrease CPU resources allocated to program 304A in response, or relation, to the information received from the management console. The hypervisor may receive, or may use, the information received (321) to modify allocation of resources of the computer to OS 302A or 302B. The hypervisor may, for example, license additional CPUs or memory in relation to data transferring to a higher performance tier, or may release licenses to some CPUs or memory in relation to data transferring to a lower performance tier. The hypervisor may then allocate the additional licensed CPUS or memory to OS 302A or 302B.

To illustrate increasing computational throughput, in relation to data transferring to tier-one, program 304A may access extents stored in, or transferring to, tier-one. By virtue of extents residing in tier-one, program 304A may be able access those extents more quickly (e.g., with lower access latency). Accordingly, the program may be able to increase processing throughput. For example, processing throughput of the program may relate to the number of IOPS the program can perform directed to data in the storage system. Reduced access latency to data stored in tier-one 360 may enable program 304A to increase the number of TOPS to that data, and correspondingly, to increase processing throughput. Similarly, reduced access latency to data in a higher performance tier may, correspondingly, reduce time in which a program is otherwise idle, waiting for an access to complete, for example. Thus, reduced access latency to data in tier-one may enable the program to then utilize previously idle CPU resources to perform additional computations, or to perform additional network communications (for example).

Allocating more CPU resources (e.g., processor threads or cores) or memory (e.g., additional pinned virtual memory pages) resources to the program may further contribute to increasing processing throughput in relation to accessing data stored in a higher performance tier. Correspondingly, according to the example, a resource management function of computer 310 (e.g., OS 302A or the hypervisor) may determine an amount of a certain resource (e.g., CPU, memory, or network resources) to allocate to program 304A in relation to data accessed by the program in tier-one of the storage system. If the resources are available to allocate to program 304A, the resource management function may perform the allocation.

Resources of the computer may be available to allocate according to the state of the resources, the computer, or resources allocated to an OS or program, at the time the computer receives (321) the information. For purposes of the disclosure, the state of the various resources or the computer at the time the computer receives the information may be considered the "dynamic allocation state" of the resources of the computer. Allocation of computer resources to the OSes (or, programs within an OS) may be according to administrative policies of the computer or computing system.

Allocation of resources (e.g., CPU or memory) may be subject to licensing policies or the amount of resources licensed at the time the computer receives the information. For example, allocation of the computer resources to program 304A may be limited by an administrative policy and, at the time the computer receives the information, program 304A may be allocated the maximum amount of a resource within that policy. In other instances, resources of the computer may be allocated to other OSes or programs at the time the information is received by the computer (or, a resource management function). For example, resources to allocate to program 304A, at the time the computer receives the information (321), may be allocated to other programs (not shown) within OS 302A, or allocated to OS 302B. Thus, in some cases, additional resources may not be available to allocate to the program according to the dynamic allocation state of those resources.

Accordingly, a resource management function in computer 310 may determine that program 304A is not able to access particular data (e.g., extents stored in tier-one) at any higher rate, or is not able to utilize lower latency access to that data in relation to the data being stored in tier-one. In this case, according to features of the disclosure, the computer sends (322) information to the management console relating to the extents accessed by program 304A. The information may indicate that the program cannot utilize the access performance corresponding to the data being stored in the tier-one 360 storage. The information may indicate that data stored in tier-one may be transferred to the tier-two 370, or that data not presently stored in a tier-one should not be transferred to tier-one.

The management console may receive (322), and may process, the information. Processing the information may include the management console determining that the storage system should discontinue storing the data (e.g., particular extents, or volumes containing the extents) included in the information in a higher performance tier, such as tier-one 360. Accordingly, the management console sends (323) to the storage system information relating to the data received (322) from the computer. The information sent (323) may be the information received, may be information resulting from the management console processing be the information received, or may be a combination of both. The information sent to the storage system may include an instruction to discontinue transferring the data, or portions (e.g., extents) of the data to tier-one, or to transfer the data, or portions of it, from tier-one to tier-two (a lower performance tier).

In response to information received (323), the storage system may discontinue transferring an extent stored in tier-two 370 to tier-one 360 storage, or may transfer data presently stored in tier-one to tier-two. In some embodiments a storage system, such as 350, may communicate directly with a computer, such as computer 310, so that 322 and 323 may be a single interaction between the computer and the storage system that does not involve a management console, or involves a management console function embodied in the computer or the storage system.

In another example, information received (321) by the computer may indicate that data is transferring to a lower performance tier (e.g., to tier-two from tier-one). Program 304A may access an extent indicated in the information to be stored in or transferring to tier-two. The extent transferring to tier-two may result from program 304A accessing that data at a lower rate, for example. Alternatively, the storage system may not be able to store the extent in tier-one according to internal demands of the storage system 350. Program 304A may, correspondingly, access the extent in tier-two at a lower rate.

In relation to accessing the data in the lower performance tier-two, program 304A (for example) may not be able to fully utilize certain resources allocated to it. For example, resources allocated to program 304A may be under-utilized because the program cannot perform as many IOPS to data stored in tier-two. Resources may be under-utilized for other reasons (e.g., other computational or I/O demands within the computer), and the data transferring to tier-two may be indicative of that under-utilization. Similarly, information received by the computer (321) may include access patterns to particular data (e.g., extents or volumes), and the access patterns may indicate that a particular program accessing that data may not be fully utilizing resources allocated to the program. Correspondingly, a resource management function of the computer, or computing system, may determine to decrease the allocation of those resources to the program.

A storage system, such as that of FIG. 3, may resume transferring data to higher performance tiers as access patterns to the data change. For example, a program accessing data (e.g., an extent or a volume) in the storage system may increase IOPS subsequent to the storage system transferring that data to a lower performance tier. As the frequency of access to that data increases above a particular threshold, for example, the storage system may resume transferring that data (e.g., one or more extents) to higher performance tiers of the storage system. Alternatively, the computer, or a management console, may send information to the storage system to instruct, or indicate, to the storage system to resume transferring that data (e.g., extents or volumes) to higher performance tiers.

In an alternative embodiment, a management console may communicate with a computer to request, or otherwise obtain, information regarding resources allocated to programs within the computer accessing data in a storage system. A management console may further communicate with a storage system regarding accesses to and locations of extents within the storage system, and a management console may operate to increase or decrease resources allocated to the programs in the computer, according to the information requested or obtained. Similarly, a management console may operate to discontinue transferring extents from one tier of the storage to another, according to the information requested or obtained.

Figure 4:
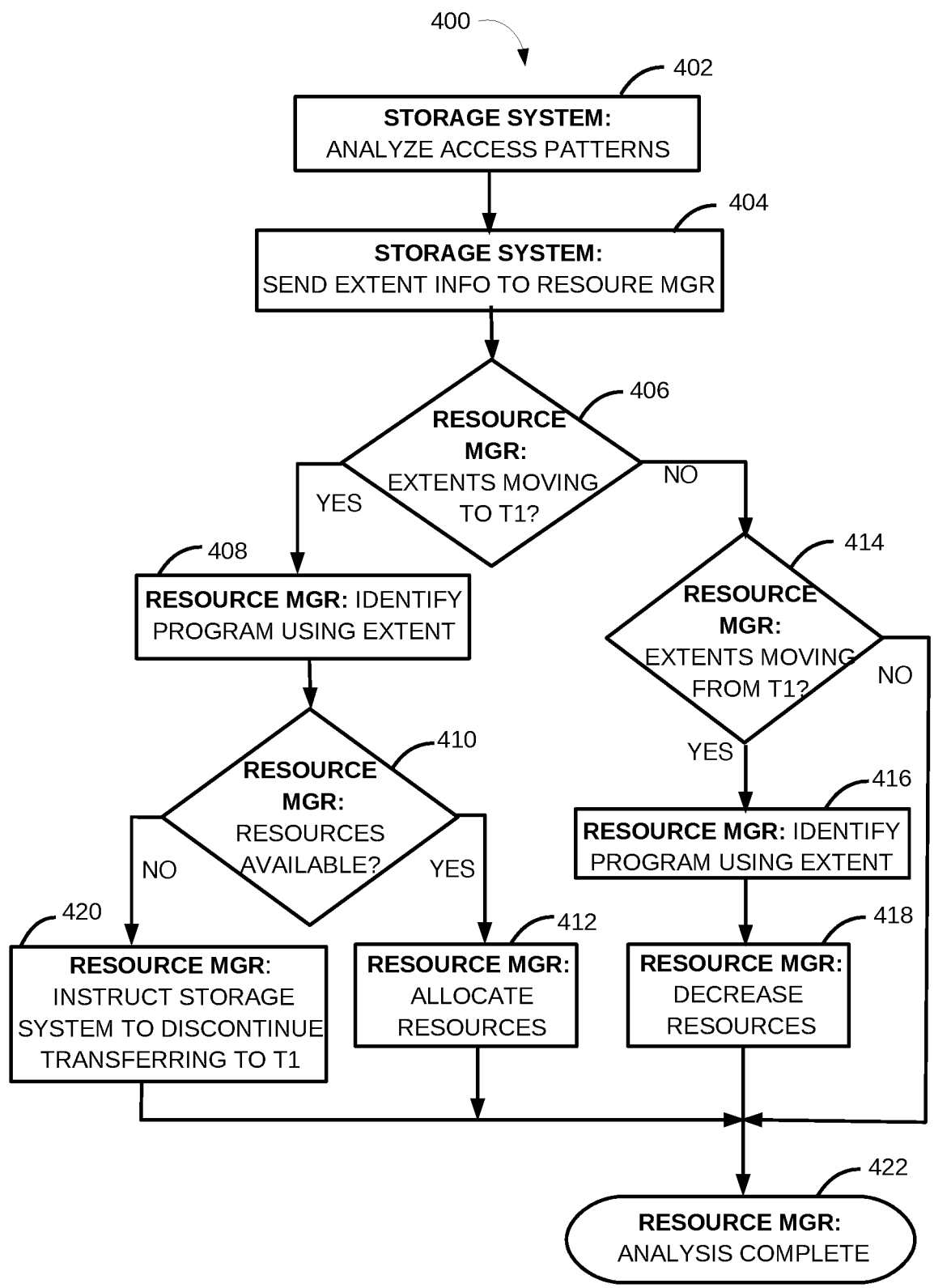
FIG. 4 illustrates an example method to manage resources of a computing system that includes a tiered storage system, according to features of the disclosure.

FIG. 4 illustrates an example method 400, according to aspects of the disclosure, to manage computing resources allocated to a program, and to manage transfer of extents from lower performance to higher performance tiers of a tiered storage system. To illustrate the method, but not limiting embodiments, an example storage system is considered to organize data stored within it into extents. The storage system is considered to include various extents into volumes, and the volumes are allocated to programs storing data in the storage system. In illustrating the example method 400, but not limiting embodiments, references of the disclosure to "extents" includes any particular extents within the storage system, or volumes containing those extents, interchangeably. For further purposes of illustration, but also not limiting to embodiments, the example storage system includes tier-one (T1) and tier-two (T2) storage, in which T1 is considered higher performance in comparison to T2.

The method 400 is illustrated as performed by the storage system and a resource manager. A resource manager may be any component, or combination of components, within a computing system that operates to allocate (or, de-allocate) resources of the computing system to programs (e.g., OSes, or programs operating within the computer or an OS). A resource manager may be a component of another computer in communication with the computer storing data in the storage system, such as an OS in another computer (e.g., a virtual machine sensor program, or a system management program). A resource manager may be a hypervisor, an OS, or an application or program in the computer or the storage system, or may be a combination of any of these. A resource manager may be embodied in a management console, or a program (e.g., a plug-in) of a management console.

It will be apparent to one of ordinary skill in the art that a resource manager may be embodied in a variety of components of a computing system, or a combination of such components. Alternatively, an embodiment may not include a resource manager in the manner of the disclosure. The illustration is not intended to limit embodiments, and a single component of a computing system—such as a computer, a management console, the storage system, or a function or component of these—may perform the method.

At 402 the storage system monitors accesses to extents stored within the storage tiers and analyzes particular metrics, such as frequency or number of access to various extents. The storage system may use the metrics to determine access patterns. As part of the analysis the storage system may determine that a particular extent is accessed at a high rate and may transfer that extent to T1. Alternatively, in relation to particular metrics, the storage system may determine that a particular extent (or, other extents within that same volume, for example) should be, or is likely to be, stored in T1. Accordingly, the storage system may prepare or initiate the transfer of the extent(s) to T1. Hereinafter, an extent "transferring" to, or from, T1 (or, in general, a tier of the storage system) encompasses the extent being predicted to transfer, prepared for transfer, or in the process of transferring, to or from T1 (or, in general, a tier of the storage system).

The storage system may determine an access rate to be a high rate based on the number of accesses to an extent exceeding a threshold value. The threshold value may be a number of accesses per second, or a number of accesses to an extent that is a fraction of a number of accesses to a set of extents. The threshold value may be a fixed value, or may be variable, such as in relation to varying access latency, or frequency, to extents. Alternatively, the storage system may determine that the access rate is a high rate, or that particular extents should transfer to T1, based on the storage system having to queue accesses to that extent and the queue having a particular depth (or, service rate).

At 404 the storage system sends information from the monitoring or the analysis to the resource manager. The information may include access patterns, or identify particular extents that are in, or transferring to, T1 (or, alternatively, to T2). The storage system may periodically repeat 402 and 404 as access rates to various extents change, or as extents are transferred into or out of T1 or T2. The storage system may repeat 402 and 404 according to a fixed period or a user-tunable period. In some embodiments the storage system may repeat 402 and 404 in response to changes in particular states of the storage system or extents. Such states may be, for example, an increase in the rate at which extents are transferred into T1, the amount of space available in T1 at a particular time, or changes to the configuration of volumes within the storage system.

At 406 the resource manager analyzes the information received at 404 to determine if particular extents are stored in, or are transferring to, T1 and to identify the extents, or volumes containing the extents. These may include extents the resource manager does not presently know to be stored in T1 storage, or not reported in previous information received at 404 to be stored in or transferring to T1 storage, but are included in the present information. The resource manager may have information regarding programs in the computer accessing data in the storage system. Alternatively, the resource manager may be configured to obtain such information from a component of the computing system, such as the computer, or an OS or hypervisor in the computer.

If particular extents are identified, at 404, as stored in or transferring to T1, at 408 the resource manager identifies programs using those extents, or programs using storage volumes that contain one or more of those extents. Such a program may be a program operating within an operating system (e.g., a workload partition), may be an instance of an operating system in a VM, or may be any program operating within a computer and storing information in the storage system.

At 410 the resource manager determines whether there are additional computer resources that could be made available to the program identified at 408. For example, the computer may be able to allocate additional CPUs (or, cores or threads of a CPU) to the program, or may activate more CPU licenses to make more CPUs (or, cores or threads of a CPU) available to the program. Similarly, a computer may be able to allocate more memory, or activate more memory licenses, to make more memory available to the program. A computer may be able to allocate more network bandwidth to the program (e.g., assign another network interface or connection in a network trunk, or increase the capacity of a virtual network interface). Additional resources such as these may enable the program to increase the number or rate of accesses, or number of IOPS, to extents identified at 406. Increasing the rate of access or IOPS may, in turn, result in the storage system preparing or initiating the transfer of other extents to T1, such as other extents in the same volume(s) as extents identified at 406.

If, at 410, the resource manager determines there are more resources available, the resource manager at 412 allocates those resources to the program. At 422 the resource manager determines that analysis of the information received at 404 is complete. Alternatively, at 410, the resource manager may determine there are not additional resources available. For example, the computer CPU licensing policy may not allow for licensing more CPUs, or the program may have reached a CPU "capping" level (e.g., a maximum level of CPU resource the program is permitted). Accordingly, at 420 the resource manager instructs the storage system to discontinue storing in, or transferring to, T1 particular extents accessed by the program.

In various embodiments the instruction at 420 may direct the storage system to discontinue storing in, or transferring to, T1 the particular extents or may discontinue storing in, or transferring to, T1 extents within a particular volume (or, volumes). The instruction may include discontinuing monitoring accesses to particular extents, or to extents within a volume. Alternatively, the instruction may direct the storage system to discontinue storing in, or transferring to, T1 the particular extents, or extents within a volume, but to continue to monitor accesses to those extents. The instruction may further include instructing the storage system to transfer extents presently stored in T1 to T2 (i.e., another tier).

The storage system, at 420, may discontinue storing in, or transferring to, T1 the extents, or may discontinue monitoring accesses to the extents, according to the particular aspects of the instruction (e.g., discontinue transferring but continue monitoring, or discontinue both). The storage system may further transfer the extents, if stored in T1, to another tier, such as T2 (e.g., a lower performance tier). The resource manager, may, subsequently, instruct the storage system to resume transferring the extents to T1, or to resume monitoring accesses to the extents, according to the particular aspects of the instruction at 420. Instructing the storage system to resume monitoring or transferring the extents to T1 may be in response to resources becoming available to allocate to programs using those extents. Instructing the storage system to resume monitoring or transferring the extents to T1 may be in response to the storage system repeating 402 and 404 and the resource manager subsequently receiving (404) and processing (406 through 418) information regarding various extents.

Alternatively at 406, the resource manager may determine that particular extents are not transferring to T1. At 414, the resource manager may determine if, instead, particular extents in the information received at 404 are transferring, or have transferred, from T1. Such extents may have been indicated in information received previously, at 404, to be stored in, or transferring to, T1 and that are not indicated in information received subsequently, at 404, to be presently stored in, or transferring to, T1. For particular extents that have transferred, or are transferring, from T1, at 416 the resource manager identifies programs using those extents, or using volumes that contain one or more of those extents.

At 418 the resource manager determines, based on particular extents used by the program identified at 416, and those extents transferring, or having transferred, out of T1, whether the program is able to fully utilize resources of the computer allocated to that program. If the program is not able to fully utilize those resources, the resource manager may reduce those resources. For example, the resource manager may reduce the number of CPUs (or, CPU cores or threads) allocated to the program, or deactivate CPU licenses to decrease CPUs available to the program. Similarly, a resource manager may deallocate memory allocated to the program, or may deactivate memory licenses related to memory deallocated from the program. A resource manager may deallocate network bandwidth allocated to the program (e.g., remove a network interface or connection in a trunk, or decrease the capacity of a virtual network interface). After decreasing the resources at 418 the resource manager determines, at 422, that analysis of the extents in the information received at 404 is complete.

One of ordinary skill in the art that will appreciate that various alternative embodiments may employ the features of the disclosure illustrated by the example method 400.

Figure 5:
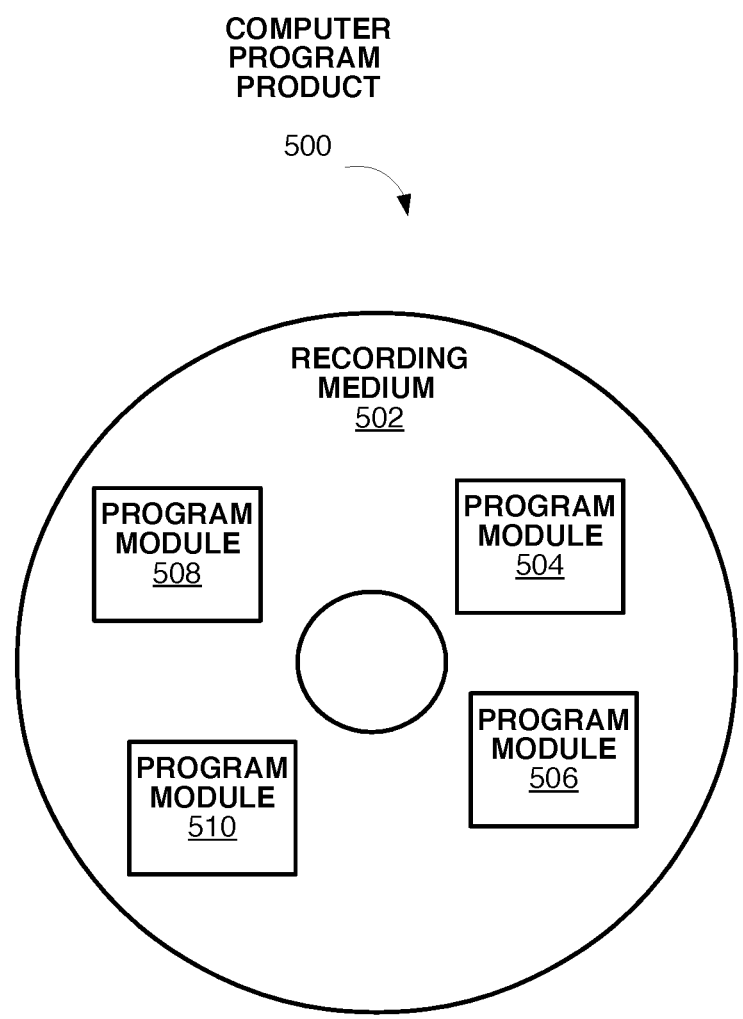
FIG. 5 is a block diagram illustrating a computer program product that may embody methods and structures of the disclosure.

FIG. 5 depicts an article of manufacture or computer program product 500 that is an embodiment of the disclosure. The computer program product 500 may include a recording medium 502, and the recording medium 502 may store program modules 504, 506, 508, and 510 for a computer to carry out the aspects of the disclosure. The recording medium 502 may be a CD ROM, DVD, tape, diskette, non-volatile or flash memory, storage medium accessed by a network connection, or other similar computer readable medium for containing a program product.

A sequence of program instructions within, or an assembly of one or more interrelated modules defined by, the program modules 504, 506, 508, or 510 may direct a computer to implement the aspects of the disclosure including, but not limited to, the structures and operations illustrated in and described in the present disclosure.

The present disclosure may be embodied as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause the computer, other programmable apparatus, or other device to perform a series of operational steps to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In general, the descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for managing locality of data in a tiered storage system comprising a plurality of storage tiers, the method comprising:
   receiving data locality information associated with locating a set of data in a first tier of the plurality of storage tiers;
   transmitting, in response to receiving the data locality information, a data locality directive having instructions to discontinue locating the set of data in the first tier and start locating the set of data in a second tier of the plurality of storage tiers, the data locality directive being associated with a program operating in a computer communicatively coupled to the tiered storage system, wherein the data locality directive is based, at least in part, on an amount of a resource of the computer to allocate to the program;
   adjusting, based at least in part on relative performance characteristics of the first and second tiers and the data locality information, an amount of the resource of the computer allocated to the program; and
   executing a particular number of I/O operations per second (IOPS) in relation to the adjusted amount of the resource allocated to the program.

2. The method of claim 1, wherein the data locality directive indicates to discontinue locating the data in the first tier based on the amount of the resource limiting utilization of the data when located in the first tier.

3. The method of claim 1, wherein the data locality directive indicates to discontinue locating the data in the first tier based on locating the data in the first tier limiting the program utilizing the amount of the resource.

4. The method of claim 1, wherein the data locality information comprises access patterns associated with the program accessing the data in at least one of the first and second tiers.

5. The method of claim 1 further comprising determining, based on the data locality information, to decrease the amount of the resource in response to the second tier having a lower performance level than the first tier.

6. The method of claim 1 further comprising determining, based on the data locality information, to increase the amount of the resource in response to the second tier having a higher performance level than the first tier.

7. A system for managing resources in a computing system, the system comprising:
   a computer having a processor and a memory, the computer being communicatively coupled to a tiered storage system having a plurality of storage tiers, wherein the processor is configured to perform a method comprising:
   receiving data locality information associated with locating a set of data in a first tier of the plurality of storage tiers;
   transmitting, in response to receiving the data locality information, a data locality directive having instructions to discontinue locating the set of data in the first tier and start locating the set of data in a second tier of the plurality of storage tiers, the data locality directive being associated with a program, wherein the data locality directive is based, at least in part, on an amount of a resource of the computer to allocate to the program;

adjusting, based at least in part on relative performance characteristics of the first and second tiers and the data locality information, an amount of the resource of the computer allocated to the program; and executing a particular number of I/O operations per second (IOPS) in relation to the adjusted amount of the resource allocated to the program.

8. The system of claim 7 wherein the data locality information comprises one of the data located in the second tier and the data transferring to the second tier.

9. The system of claim 7, wherein the data locality directive indicates to discontinue locating the data in the first tier based on the amount of the resource limiting utilization of the data when located in the first tier.

10. The system of claim 7, wherein the data locality directive indicates to discontinue locating the data in the first tier based on locating the data in the first tier limiting the program utilizing the amount of the resource.

11. The system of claim 7, wherein the data locality information comprises access patterns associated with the program accessing the data in at least one of the first and second tiers.

12. The system of claim 7, wherein the resource is at least one of a portion of the processor, a portion of a co-processor, and a portion of the memory.

13. A computer program product for managing resources in a computing system, the computer program product comprising a computer readable storage medium having program instructions embodied therewith, the program instructions executable by at least one processor to perform a method comprising:

receiving data locality information associated with locating a set of data in a first tier of a plurality of storage tiers in a tiered storage system;

transmitting, in response to receiving the data locality information, a data locality directive having instructions to discontinue locating the set of data in the first tier and start locating the set of data in a second tier of the plurality of storage tiers, the data locality directive being associated with a program operating in a computer communicatively coupled to the tiered storage system, wherein the data locality directive is based, at least in part, on an amount of a resource of the computer to allocate to the program;

adjusting, based at least in part on relative performance characteristics of the first and second tiers and on the data locality information, an amount of the resource of the computer allocated to the program; and executing a particular number of I/O operations per second (IOPS) in relation to the adjusted amount of the resource allocated to the program.

14. The computer program product of claim 13, wherein the data locality directive indicates to discontinue locating the data in the first tier based on the amount of the resource limiting utilization of the data when located in the first tier.

15. The computer program product of claim 13, wherein the data locality directive indicates to discontinue locating the data in the first tier based on locating the data in the first tier limiting the program utilizing the amount of the resource.

16. The computer program product of claim 13, wherein the data locality information comprises access patterns associated with the program accessing the data in at least one of the first and second tiers.

17. The computer program product of claim 13, wherein the resource is at least one of a portion of the processor, a portion of a co-processor, and a portion of a memory.

* * * * *